United States Patent
Sakamoto et al.

(10) Patent No.: US 6,577,385 B1
(45) Date of Patent: Jun. 10, 2003

(54) OPTICAL TIME-DOMAIN REFLECTOMETER CAPABLE OF DETERMINING WHEN A TEST OF AN OPTICAL FIBER SHOULD BE CONDUCTED

(75) Inventors: Takashi Sakamoto, Atsugi (JP); Keita Kato, Tokyo (JP); Masaki Omori, Atsugi (JP); Kimiaki Iwasaki, Atsugi (JP)

(73) Assignee: Anritsu Corporation, Tokyo (JP)

( * ) Notice: Subject to any disclaimer, the term of this patent is extended or adjusted under 35 U.S.C. 154(b) by 16 days.

(21) Appl. No.: 09/806,734

(22) PCT Filed: Sep. 6, 2000

(86) PCT No.: PCT/JP00/06025
§ 371 (c)(1),
(2), (4) Date: Apr. 4, 2001

(87) PCT Pub. No.: WO01/18519
PCT Pub. Date: Mar. 15, 2001

(30) Foreign Application Priority Data

Sep. 6, 1999 (JP) .......................................... 11-251894

(51) Int. Cl.$^7$ ............................................. G01N 21/00
(52) U.S. Cl. ..................................................... 356/73.1
(58) Field of Search .................. 356/73.1, 44, 319, 356/320, 432, 445; 385/24, 21, 13, 128, 123, 114, 135, 134, 42; 359/124–135, 110, 140, 484, 341.2, 152, 117, 173, 177, 120, 189, 167, 496, 161, 187, 136, 341; 250/227.11–227.23; 374/137, 161; 244/3.17, 75 R (56) References Cited

U.S. PATENT DOCUMENTS 6,055,044 A * 4/2000 Uchiyama et al. ......... 356/73.1
6,219,177 B1 * 4/2001 Tamura ....................... 359/124

FOREIGN PATENT DOCUMENTS

JP          10-227719          8/1998

* cited by examiner

Primary Examiner—Tu T. Nguyen
(74) Attorney, Agent, or Firm—Frishauf, Holtz, Goodman & Chick, P.C.

(57) ABSTRACT

An optical time-domain reflectometer (OTDR) having a light-emitting element, a branching section, a light-receiving section, and a processing section. The light-emitting element emits pulsating measuring light when driven. The branching section applies the measuring light emitted from the light-emitting element, to an optical fiber to be measured, and branches the light supplied from the optical fiber. The light-receiving section receives the light branched by the branching section and detects a level of the light received. The processing section detects a level of the light supplied from the optical fiber after the OTDR is connected to the optical fiber, while not driving the light-emitting element. The processing section drives the light-emitting element only when the level of the light received is equal to or lower than a preset value.

17 Claims, 5 Drawing Sheets

OPTICAL TIME-DOMAIN REFLECTOMETER CAPABLE OF DETERMINING WHEN A TEST OF AN OPTICAL FIBER SHOULD BE CONDUCTED

This application is a U.S. National Phase Application under 35 USC 371 of International Application PCT/JP00/06025 (not published in English) filed Sep. 6, 2000.

TECHNICAL FIELD

This invention relates to an optical time-domain reflectometer (hereinafter referred to as "OTDR") that is use search for defective points in an optical fiber. More particularly, the invention relates to an OTDR that does not influence the communication via the line during measuring.

BACKGROUND ART

As is known, an OTDR is connected to one end of an optical fiber and applies a pulsed light beam into the optical fiber from the end thereof. The OTDR measures the time that lapses until reflected light (backscattered light) arrives from the optical fiber, the level of the reflected light and the like. The losses in the optical fiber, the positions where the losses occur (e.g., connection points), the positions of far ends, and the like are thereby determined.

Figure 6:
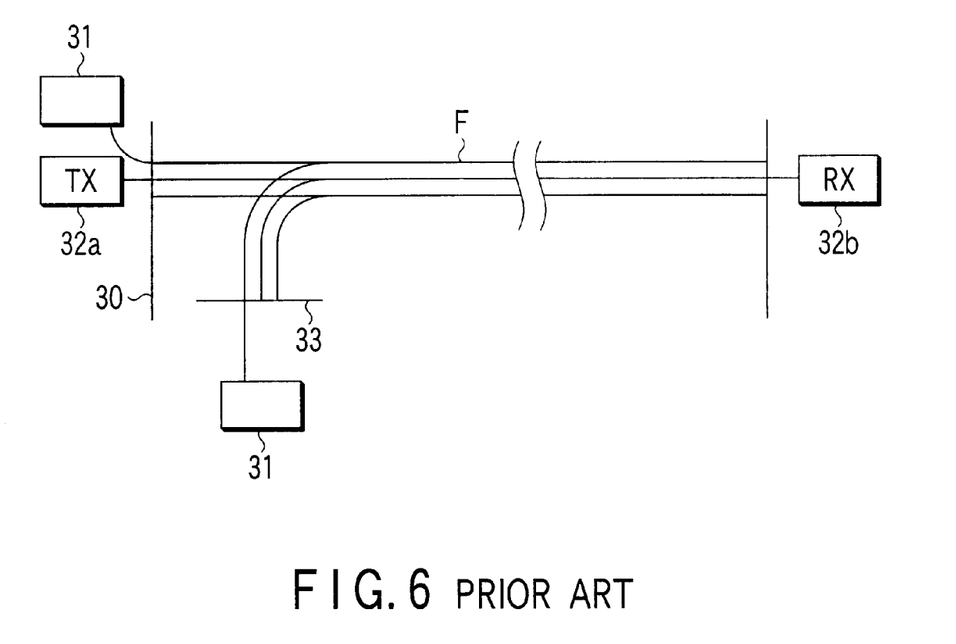
FIG. 6 is a diagram illustrating how optical fibers are laid, for explaining the prior art.

FIG. 6 is a diagram showing how optical fibers are laid and how the various characteristics of the optical fibers are measured by a conventional technique.

On a panel 30 a port is provided for a plurality of optical fibers F. Of the fibers F, one line is used to achieve communication (i.e., an active line) is connected to a transmitter 32a and a receiver 32b.

For convenience, only one core line of the optical fiber F, or active line, is illustrated in FIG. 6. In practice, many lines of the optical fiber F serve as active lines.

An OTDR 31 is connected to one of the optical fibers F that are not used, that is, those other than the active lines, in order to perform various measurements on that optical fiber F.

The core line that is used as an active line is known and identified with the core-line number and the like. The OTDR 31 is therefore connected to a port of a core-line number not assigned to the active line.

The core-line number may be mistaken for another and the measuring may be started. In this case, measuring light (pulsed light) is applied into the core of the active line through which communication is being achieved. This may influence the communication.

Also, the waveform of the measuring signal changes to an abnormal one. Consequently, normal measuring of characteristics may not be accomplished.

The panel 30 has hundreds of ports or thousands of ports. Almost all ports are in connected state, no matter whether they are used for active lines. To initiate measuring, the ports are disconnected and connected to the OTDR. Hence, one core-line number may be mistaken for another, as mentioned above.

Once the port of any active line is disconnected, the light being used is no longer applied, inevitably causing a problem. In this condition, any port that is not of any active line can be identified, only by the core-line number allocated to the port. This may cause a mistake.

In some cases, a measuring port 33 is provided at a position different from the position where the panel 30 is arranged.

The measuring port 33 is connected to each core line of the fiber F by means of a coupler (not shown) or the like. The port 33 is used during the measuring only; it is usually opened.

Once the OTDR 31 is connected to the measuring port 33 to effect measuring, the core line of the fiber F, which is connected to the transmitter 32a and receiver 32b, cannot be visually detected.

When light is applied to the core line of a wrong number, thereby starting the measuring, the measuring signal will immediately enter the communication line, adversely influencing the communication. In addition, the measuring side will be affected, resulting in an abnormal waveform and the like.

DISCLOSURE OF INVENTION

The present invention has been made in order to solve the problems described above. The object of the invention is to provide an OTDR which prevents various measuring of an active line effecting communication, which influences neither the communication line nor the measuring and which can therefore perform measuring in safety.

According to one aspect of the invention, there is provided an OTDR having:

a light-emitting element (2b) for emitting pulsating measuring light when driven;

branching means (3) for applying the measuring light emitted from the light-emitting element, to an optical fiber to be measured, and branching light supplied from the optical fiber; and light-receiving means (11) for receiving the light branched by the branching means and detecting a level of the light received.

The OTDR further comprises processing means for detecting a level of the light supplied from the optical fiber after the OTDR is connected to the optical fiber, while not driving the light-emitting element, and for driving the light-emitting element only when the level of the light received is equal to or lower than a preset value.

According to another aspect of this invention, there is provided an OTDR comprising:

light source driving means;

a light source for emitting pulsating measuring light when driven by the light source driving means;

branching means for applying the measuring light emitted from the light source, to an optical fiber to be measured, and branching light supplied from the optical fiber;

light-receiving means for receiving the light branched by the branching means and detecting a level of the light received;

determining means for causing the light-receiving means to detect the level of light received while the light source is not emitting light and for determining that the optical fiber is not serving as a communication line, only when the level of light received is equal to or lower than a preset value; and processing means for causing the light source driving means to drive the light source, thereby to start the measuring of the optical fiber, when the determining means determines that the optical fiber is not serving as a communication line.

According to a further aspect of the invention, there is provided a method of measuring an optical fiber by use of an optical time-domain reflectometer, the method comprising the steps of:

providing a light source that emits pulsating measuring light when driven by light source driving means;

providing branching means for applying the measuring light emitted from the light source, to an optical fiber to be measured, and branching light supplied from the optical fiber;

providing light-receiving means for receiving the light branched by the branching means and detecting a level of the light received;

causing the light-receiving means to detect the level of light received while the light source is not emitting light and determining that the optical fiber is not serving as a communication line, only when the level of light received is equal to or lower than a preset value; and causing the light source driving means to drive the light source, thereby to start the measuring of the optical fiber, when it is determined that the optical fiber is not serving as a communication line.

BEST MODE FOR CARRYING OUT OF THE INVENTION

The present invention will be summarized first.

To achieve the object described above, an OTDR according to the invention may be connected to one end of an optical fiber laid in an optical communication path. The OTDR applies measuring light into the optical fiber and measures various characteristics of the optical fiber from the condition of the light applied back from the optical fiber. The OTDR is characterized in that it comprises a light source (2), a light-receiving element (4), and processing means (8). The light source (2) emits the measuring light to the optical fiber. The light-receiving element (4) receives the light reflected from the optical fiber and detects the level of the light. The processing means (8) inhibits the light source from emitting the measuring light if the level of light the light-receiving element has detected before the emission of measuring light from the light source is higher than a prescribed level.

The OTDR may further comprise a start key (9) and processing means (8). The start key is provided for starting the various characteristics of the optical fiber. The processing means (8) detects the level of the light the light-receiving element (4) detects after the light source (2) has stopped emitting light. If the level is higher than a prescribed level, it is determined that the optical fiber is performing communication. In this case, the processing means inhibits the emission of measuring light, thereby to interrupt the measuring of characteristics.

When a power switch is turned on, the processing means (8) may detect the level of light received at the light-receiving element (4) while the light source is not emitting light. When the level of light received is equal to or higher than the preset value, the processing means may determine that the optical fiber is serving as a communication line and inhibits the emission of the measuring light, thereby interrupting the measuring of characteristics.

Further, the processing means (8) may generate an alarm informing output means (10) that it is impossible to measure the characteristics of the optical fiber, when the level of light received, detected at the light-receiving element while the light source is not emitting light is equal to or higher than the preset value.

In the structure mentioned above, when the start key (9) is depressed to measure the characteristics of the optical fiber, the processing means (8) detects the level of light received at the light-receiving element (4), while the mission of light from the light source (2) is interrupted.

Here, if the level of light received is equal to or higher than the preset value, the processing means determines that the optical fiber is serving as a communication line and inhibits the emission of the measuring light, thereby interrupting the measuring of characteristics. At the same time, the processing means generates an alarm informing output means 10 that it is impossible to measure the characteristics of the optical fiber.

Embodiments of the invention summarized above will be described, with reference to the accompanying drawings.

FIRST EMBODIMENT

Figure 1:
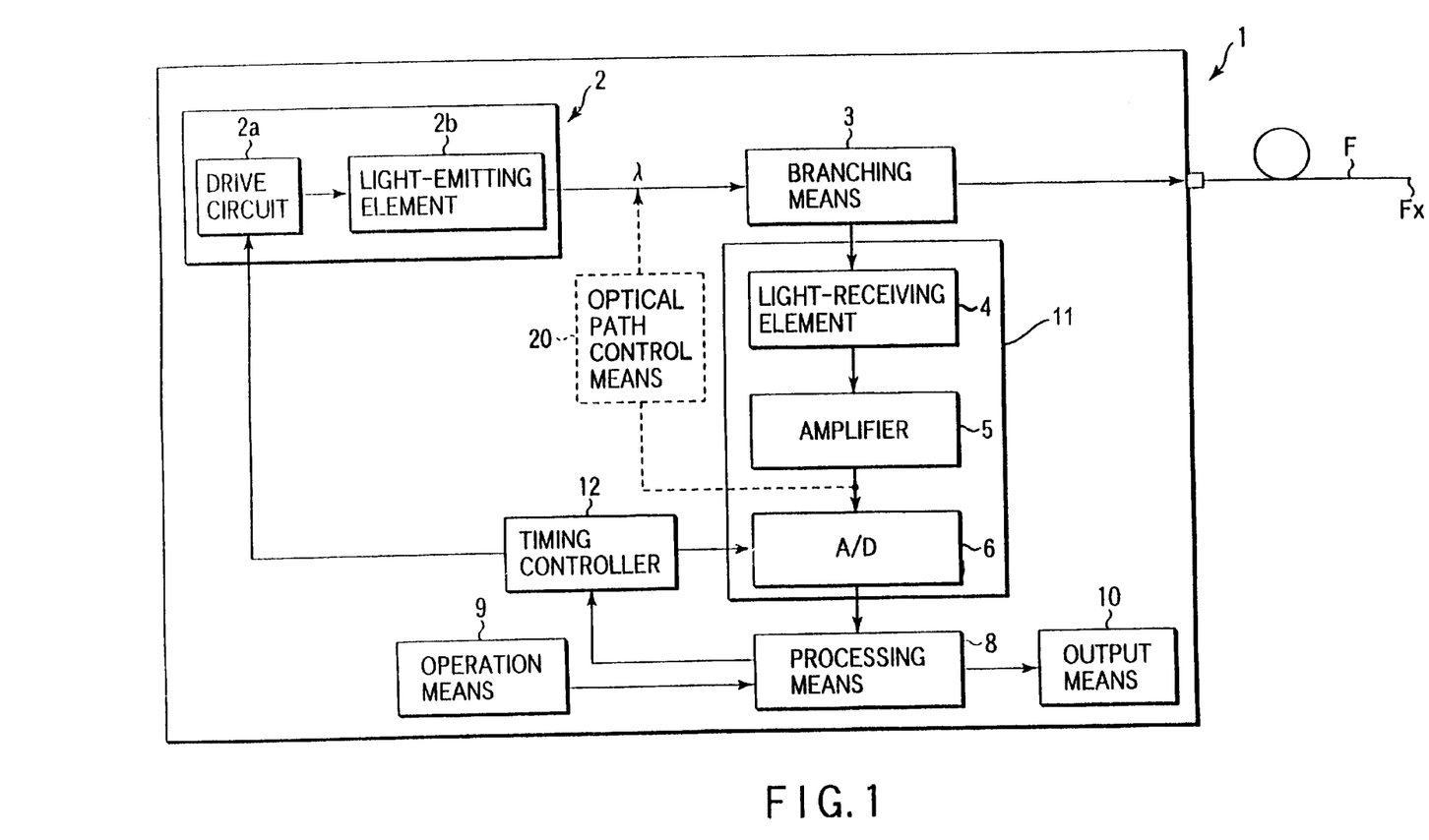
FIG. 1 is a block diagram showing an OTDR that is the first embodiment of the invention.

FIG. 1 is a block diagram showing an OTDR that is the first embodiment of the invention.

The OTDR 1 is connected to one end of an optical fiber F that has been laid in an optical communication path.

A light source 2 has a drive circuit 2a, a light-emitting element 2b such as a laser diode (LD) or the like. The light-emitting element 2b emits pulsating measuring light (a laser beam) having center wavelength $\lambda$.

The drive circuit 2a controls the driving of the light-emitting element 2b.

The pulsating measuring light emitted from the light source 2 is applied to the optical fiber F through branching means 3.

The branching means 3 is, for example, a directional optical coupler.

The branching means 3 distributes the light reflected from the optical fiber (Fresnel reflection light or back scattering light) to light-receiving means 11.

The light-receiving means 11 includes a light-receiving element 4, an amplifier 5, and an A/D converter 6. The light-receiving element 4 receives the light reflected from the optical fiber. The amplifier 5 amplifies the output of the light-receiving element 4. The A/D converter 6 performs analog-to-digital conversion on the output of the amplifier 5.

The light-receiving element 4 is composed of a photo-diode (PD) or the like, for receiving the light reflected. The element 4 outputs a detection signal when it receives the light.

The detected signal is amplified by the amplifier 5, subjected to A/D conversion in the A/D converter 6 and output to processing means 8.

The processing means 8 has a CPU and a memory section including a ROM, a RAM and the like. The processing means 8 controls the components provided in the OTDR 1.

The processing means 8 measures the characteristics of the optical fiber F in a specific sequence to be described later, on the basis of the measuring program stored in the memory section such as a ROM or the like.

The characteristics are measured by examining the communication light to determine whether the optical fiber performs its function.

Operation means 9 comprises keys, which are operated to operate the parameters, operations, display conditions the apparatus requires to measure the various characteristics.

Output means 10 receives the data processed in the processing means 8 and representing the characteristics of the optical fiber F.

The output means 10 comprises a display, an interface (I/F), and the like. The display displays characteristics, values set, alarms and the like. The interface outputs these items of data to external apparatuses.

Under the control of the processing means 8, a timing controller 12 controls the drive circuit 2a, thereby controlling the timing at which the light-emitting element 2b emits the measuring light and the timing at which the A/D converter 6 samples the signal generated when the backscattered light is detected.

How the processing means 8 of the OTDR 1 examines the communication light will be described below.

Figure 2:
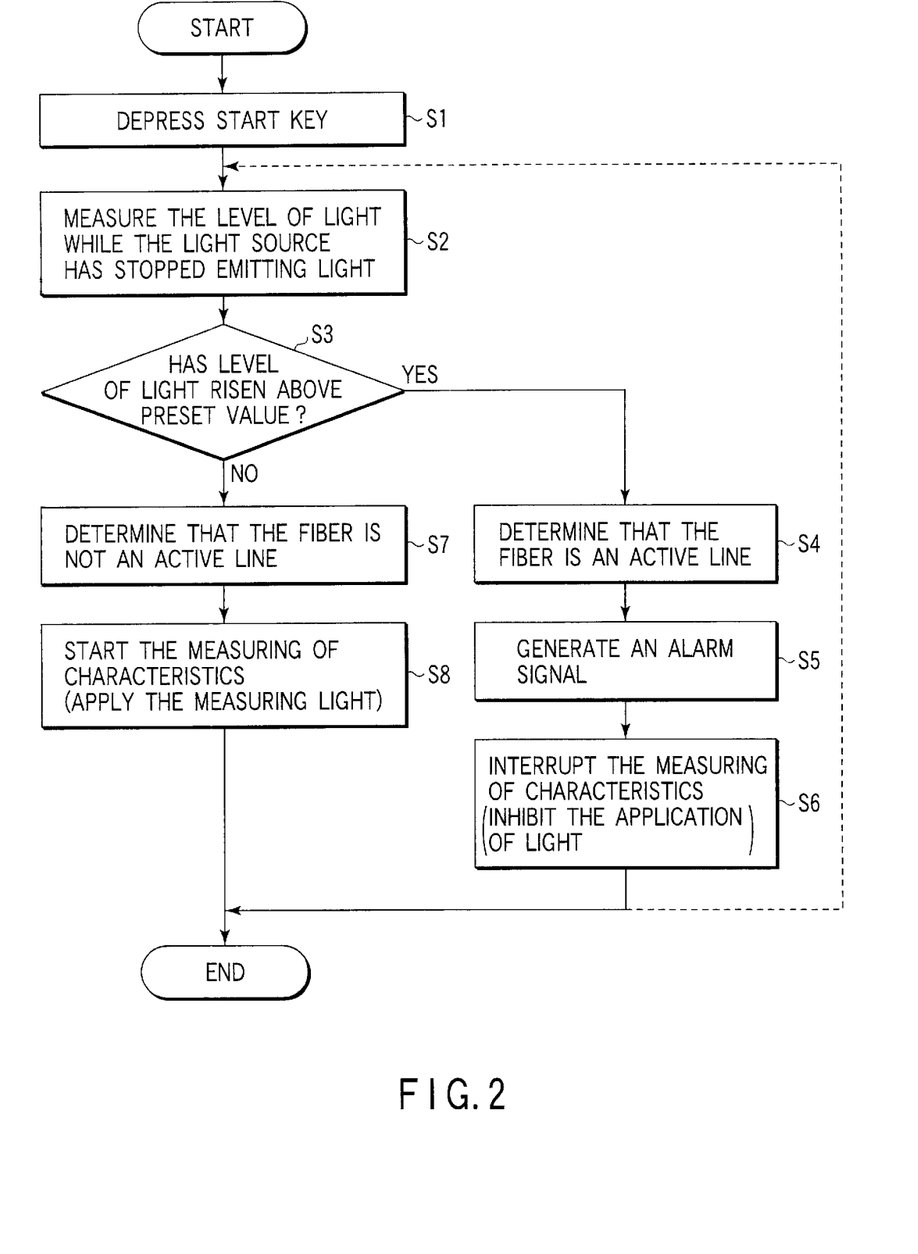
FIG. 2 is a flowchart explaining how the OTDR shown in FIG. 1 examines communication light.

FIG. 2 is a flowchart explaining how the communication light is examined.

Figure 3A:
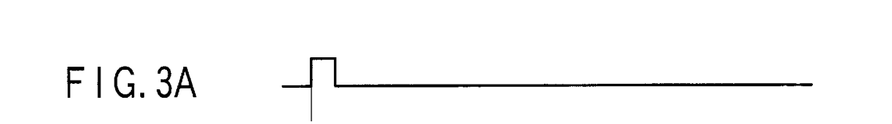
FIGS. 3A, 3B and 3C are diagrams depicting the measuring waveform of an optical fiber, detected by the OTDR of FIG. 1.
Figures 3B, 3C:
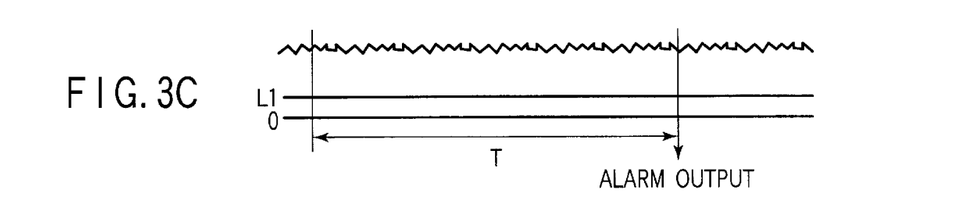
Figure 4A:
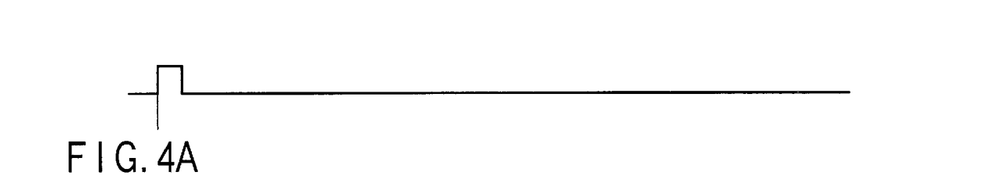
FIGS. 4A, 4B and 4C are diagrams depicting the measuring waveform of an optical fiber, detected by the OTDR of FIG. 1.
Figure 4B:
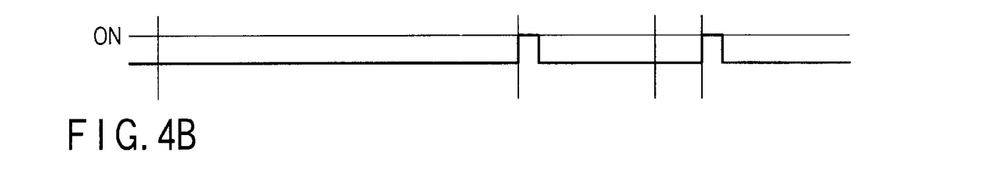
Figure 4C:
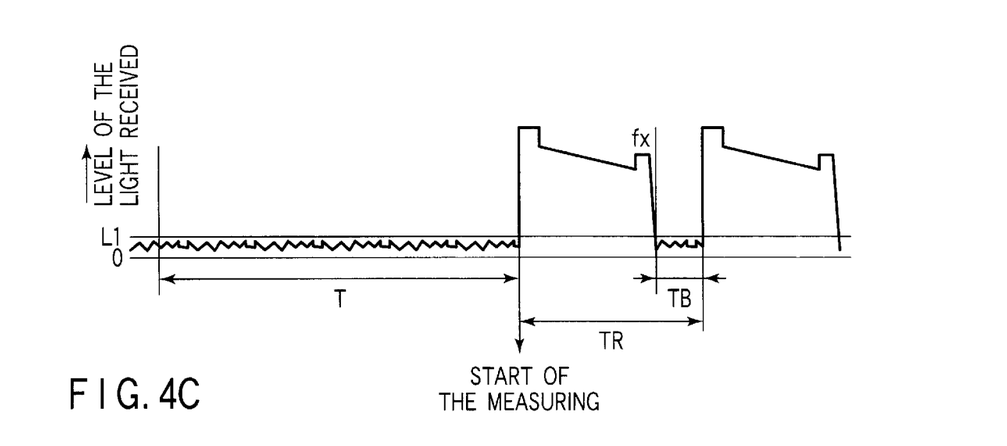

FIG. 3 and FIG. 4 are diagrams showing the measuring waveform of an optical fiber, detected by the OTDR 1.

The start key of the operation means 9 is depressed (FIG. 3A), starting the measuring of ID) characteristics (Step Si). First, the processing means 8 measures the level of the light the light-receiving means 11 has detected (Step S2). While the means 8 is measuring the level, the light-emitting element 2b remains emitting no light (FIG. 3B).

Next, the processing means 8 determines whether the level of the light received has risen above a preset value (Step S3).

The preset value L1 (see FIG. 3C) is higher than the noise level of the signal detected by the light-receiving element 4 and amplified by the amplifier 5.

A detection signal having a level higher than the preset value may be detected during a predetermined time (e.g., 1 sec) from the depressing of the start key. In this case (that is, if Yes in Step S3), the processing means 8 determines that the optical fiber F is serving as an active line (or achieving communications) (Step S4).

In this case, the processing means 8 outputs an alarm (alarm display) signal to the display of the output means 10 and the like (Step S5).

Then, the processing means 8 inhibits the light source 2 from emitting light, thereby interrupting the measuring operation on the optical fiber F (Step S6).

On the other hand, if the detection signal remains at a level lower than the preset value (that is, if No in Step S3), the processing means 8 determines that the In optical fiber F is not serving as an active line (or achieving communications) (Step S7).

Thus, the measuring of the characteristics of the optical fiber F is started when the start key is depressed (Step S8).

In the measuring process, the light-receiving means 11 receives the light applied from the light source 2 to the optical fiber F and then reflected from the optical fiber F.

It will be described how the backscattered light from the optical fiber F is measured.

When the measuring light is applied to the optical fiber F at intervals TR (see FIG. 4C) as shown in FIG. 4B, the light-receiving element 4 detects reflected light (backscattered light) that attenuates with the distance to the optical fiber F as is illustrated in FIG. 4C.

In FIG. 4C, fx indicates the light that has been reflected at the far end of the optical fiber F shown in FIG. 1 and has been detected.

With the above-mentioned process, it is possible to determine the communication condition of the optical fiber F before measuring the characteristics of the optical fiber F. If the optical fiber F is serving communication, the application of the measuring light to the optical fiber F is inhibited. This would influence neither the communication line nor the measuring.

In the embodiment described above, the start key must be pushed again to measure the optical fiber to measure the optical fiber after it is determined that the fiber F is serving communication. Nonetheless, the present invention is not limited to this embodiment.

For example, the operation may automatically go to Step S2 as shown by the dotted line in FIG. 2 if the optical fiber F is an active line, thereby effecting continuous detection.

In this case, the measuring of characteristics can be started immediately after the communication is interrupted or completed.

The timing of detecting the condition of the communication light is not limited to the start of measuring the characteristics of the optical fiber F. Rather, the condition may be detected after the start of measuring the characteristics is started, that is, during the measuring of the characteristics.

In this case, Step S2 and the following steps, shown in FIG. 2, may be automatically performed during the blank period (TB) shown in FIG. 4C, in which the characteristics are not measured at all.

Measuring light is not applied to the optical fiber F during the blank period TB. Thus, it is determined that the fiber F is serving as an active line, if the light received is at a level equal to or higher than the prescribed level. If the light received is at a level lower than the prescribed level, it is determined that the fiber F is not serving as an active line. In either case, an appropriate process is performed.

If it is determined that the fiber F is an active line, Step S6 and the following steps shown in FIG. 2 are performed to interrupt the measuring, as is indicated by the solid line in FIG. 2. Alternatively, the process returns to Step S2 as indicated by the dotted line, thereby to detect again the level of the light received.

SECOND EMBODIMENT

The second embodiment of the invention will be described.

An OTDR 1, which is the second embodiment of the invention, will be described.

The OTDR 1 according to the second embodiment is similar in structure to the first embodiment shown in FIG. 1.

Figure 5:
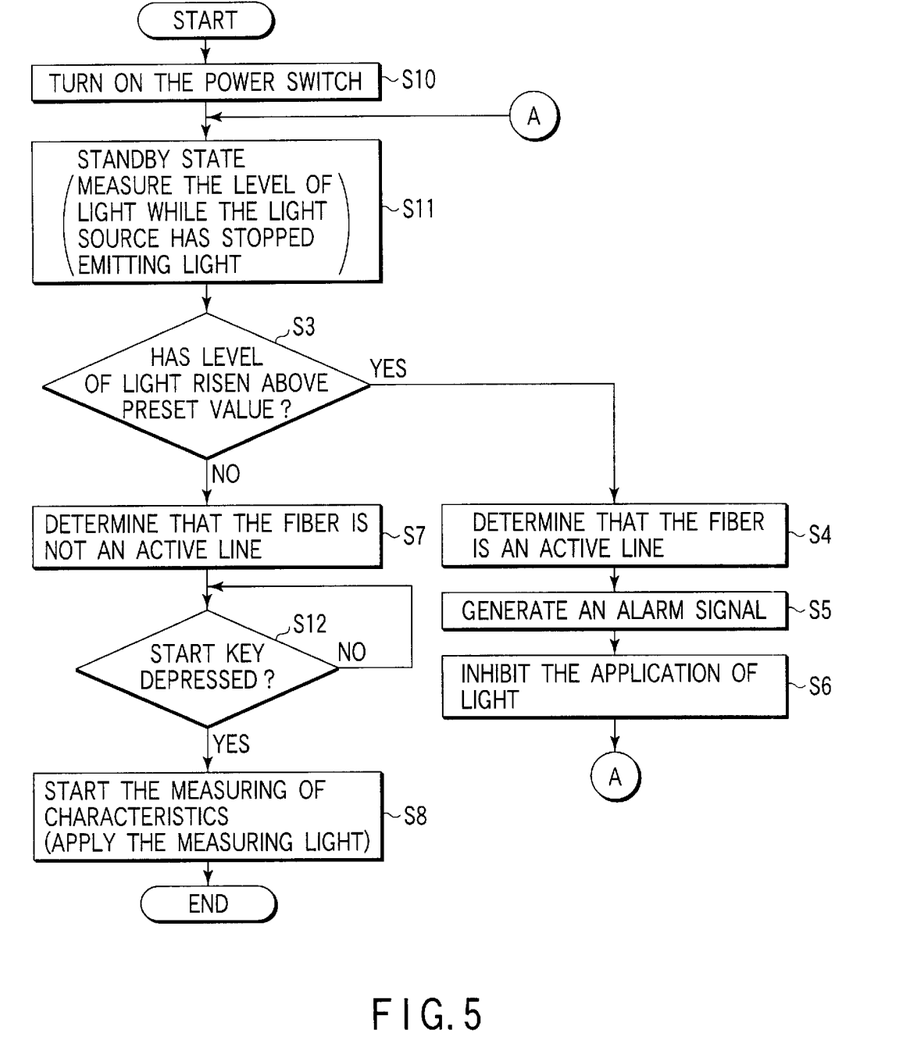
FIG. 5 is a flowchart explaining the operation of an OTDR that is the second embodiment of the invention.

FIG. 5 is a flowchart explaining the operation of the second embodiment.

The steps of the operation will be designated by identical symbols and will not be described.

First, the power switch to the OTDR 1 is turned on (Step S10). The processing means 8 enters into a standby state (Step S11).

In the standby state, various initial values are set which are required for measuring the characteristics of the optical fiber F.

In the standby state, the level of the light received at the light-receiving element 4 is measured, while interrupting the emission of light from the light source 2.

Thereafter, it is determined whether the optical fiber is an active line or not (Steps S3 to S8).

After the power switch is turned on, it may be determined that the fiber F is not an active line (Step S7). In this case, it is determined whether the start key has been depressed to measure the characteristics of the optical fiber (Step S12). When the start key is depressed (if YES in Step S12), the measuring of the characteristics of the optical fiber is immediately started.

After the power switch is turned on, it may be determined that the fiber F is an active line (Step S4). If this is the case, the application of measuring,light is inhibited (Step S6) and the process returns to Step S11.

Thus, the standby state continues as long as the fiber F is regarded as an active line. When the start key is depressed (if YES in Step S12) after the fiber F is found to be no longer an active line, the measuring of characteristics of the optical fiber can be started at once.

The OTDR 1 according to this embodiment automatically determines whether an active line is available or not, when the power switch is turned on, and waits for the start of characteristic measuring.

The present invention is not limited to the embodiment described above. Rather, various modifications can be made.

An optical path control means 20 such as a shutter may be provided as indicated by dotted lines in FIG. 1, for opening and closing the optical path between the light-emitting element 2b and the branching means 3 in accordance with the output of the amplifier 5. In this case, it is possible to prevent the application of measuring light to the active line, even if the light-emitting element 2b remains driven at all times.

That is, to measure the various characteristics of the optical fiber, the optical path control means 20 first closes the optical path between the light-emitting element 2b and the branching means 3.

While the output of the amplifier 5 remains at a value which corresponds to the level of the light received and which is equal to or higher than a preset level, the means 20 inhibits the application of measuring light from the optical path.

When the output of the amplifier 5 remains at a value that corresponds to the level of the light received and is equal to or lower than the preset level, the optical path control means 20 opens the optical path between the light-emitting element 2b and the branching means 3. This allows the application of measuring light from the optical path.

As described above in detail, the application of measuring light is inhibited in the structure of this invention in the process of measuring the various characteristics of an optical fiber, if the light-receiving element receives light at a level equal to or higher than a preset level. The application of measuring light to an active line serving communication can therefore be prevented.

The characteristics can therefore be smoothly measured in safety, without influencing the communication and the measuring.

The communication light may be examined when the start key is operated to start the measuring of the various characteristics of the optical fiber. In this case, it is possible to detect the communication condition on the line when the measuring is started. Thus, the measuring of characteristics can be carried out in safety.

Further, the communication light may be examined when the power switch is turned on. If this is the case, the communication condition of the line is detected every time the switch is turned on, thereby to accomplish the measuring of characteristics in safety.

An alarm may be output while the line is serving the communication, informing the operator that it is now impossible to measure the characteristics of the line.

What is claimed is:

1. An optical time-domain reflectometer (OTDR) comprising:

a light-emitting element for emitting pulsating measuring light when driven, branching means for applying the measuring light from the light-emitting element to an optical fiber to be measured, and for branching light supplied from the optical fiber, light-receiving means for receiving the light branched out by the branching means and detecting a level of the light received, detecting means for detecting a level of the light supplied from the optical fiber after the OTDR is connected to the optical fiber, while not-driving the light-emitting element, and processing means for driving the light-emitting element only when the level of the light detected by the detecting means is equal to or lower than a preset value, when the optical fiber is not serving as a communication line.

2. The OTDR according to claim 1, which further comprises a start key for starting measurement of various characteristics of the optical fiber, and wherein when the start key is operated the processing means detects the level of light received at the light-receiving means while the light-emitting element is not emitting light, and when the level of light received is equal to or higher than the preset value, the processing means determines that the optical fiber is serving as a communication line and inhibits the emission of the measuring light.

3. The OTDR according to claim 1, wherein when a power switch is turned on, the processing means detects the level of light received at the light-receiving means while the light-emitting element is not emitting light, and when the level of light received is equal to or higher than the preset value, the processing means determines that the optical fiber is serving as a communication line and inhibits the emission of the measuring light.

4. The OTDR according to claim 1, wherein the processing means generates an alarm indicating that it is impossible to measure characteristics of the optical fiber, when the level of light received, detected at the light-receiving means while the light-emitting element is not emitting light, is equal to or higher than the preset value.

5. The OTDR according to claim 1, which further comprises a start key for starting measurement of various characteristics of the optical fiber, and wherein when the start key is operated, the processing means detects the level of light received at the light-receiving means while the light source is not emitting light, and when the level of light received is equal to or higher than the preset value, the processing means determines that the optical fiber is serving as a communication line and inhibits the emission of the measuring light.

6. An optical time-domain reflectometer (OTDR) comprising:
light source driving means;
a light source for emitting pulsating measuring light when driven by the light source driving means;
branching means for applying the measuring light emitted from the light source to an optical fiber to be measured, and for branching light supplied from the optical fiber;
light-receiving means for receiving the light branched by the branching means and detecting a level of the light received;
determining means for causing the light-receiving means to detect the level of light received while the light source is not emitting light and for determining that the optical fiber is not serving as a communication line, only when the level of light received is equal to or lower than a preset value; and
processing means for causing the light source driving means to drive the light source, thereby to start measuring characteristics of the optical fiber, when the determining means determines that the optical fiber is not serving as a communication line.

7. The OTDR according to claim 6, wherein when a power switch is turned on, the processing means detects the level of light received at the light-receiving means while the light source is not emitting light, and when the level of light received is equal to or higher than the preset value, the processing means determines that the optical fiber is serving as a communication line and inhibits the emission of the measuring light.

8. The OTDR according to claim 6, wherein the processing means generates an alarm indicating that it is impossible to measure characteristics of the optical fiber, when the level of light received, detected at the light-receiving means while the light source is not emitting light, is equal to or higher than the preset value.

9. A method of measuring characteristics of an optical fiber using an optical time-domain reflectometer, said method comprising:
providing a light source that emits pulsating measuring light when driven by light source driving means;
providing branching means for applying the measuring light emitted from the light source to an optical fiber to be measured, and for branching light supplied from the optical fiber;
providing light-receiving means for receiving the light branched by the branching means, and for detecting a level of the light received;
causing the light-receiving means to detect the level of light received while the light source is not emitting light and determining that the optical fiber is not serving as a communication line, only when the level of light received is equal to or lower than a preset value; and
causing the light source driving means to drive the light source, thereby to start the measuring of the characteristics of the optical fiber, when it is determined that the optical fiber is not serving as a communication line.

10. An optical time-domain reflectometer (OTDR) adapted to be provided at one end of an optical fiber laid in an optical communication line, and to apply measuring light to the optical fiber and measure various characteristics of the optical fiber based on light -reflected from the optical fiber, said OTDR comprising:
a light source for emitting the measuring light to the optical fiber;
a light-receiving element for receiving the light reflected from the optical fiber;
detecting means for detecting a level of the light reflected in accordance with the light received by the light-receiving element; and
processing means for inhibiting emission of the measuring light when the level of light detected by the detecting means before the measuring light is emitted from the light source is equal to or higher than a preset value, when the optical fiber is serving as a communication line.

11. The OTDR according to claim 10, which further comprises a start key for starting measurement of various characteristics of the optical fiber, and wherein when the start key is operated, the processing means detects the level of light received at the light-receiving element while the light source is not emitting light, and when the level of light received is equal to or higher than the preset value, the processing means determines that the optical fiber is serving as a communication line and inhibits the emission of the measuring light.

12. The OTDR according to claim 10, wherein when a power switch is turned on, the processing means detects the level of light received at the light-receiving element while the light source is not emitting light, and when the level of light received is equal to or higher than the preset value, the processing means determines that the optical fiber is serving as a communication line and inhibits the emission of the measuring light.

13. The OTDR according to claim 10, wherein the processing means generates an alarm indicating that it is impossible to measure characteristics of the optical fiber, when the level of light received, detected at the light-receiving element while the light source is not emitting light, is equal to or higher than the preset value.

14. An optical time-domain reflectometer (OTDR) comprising:
a light-emitting element for emitting pulsating measuring light when driven;
branching means for applying the measuring light from the light-emitting element to an optical fiber to be measured, and for branching light supplied from the optical fiber;
light-receiving means for receiving the light branched out by the branching means and detecting a level of the light received;
processing means for detecting a level of the light supplied from the optical fiber after the OTDR is connected to the optical fiber, while not driving the light-emitting element, and for driving the light-emitting element only when the level of the light received is equal to or lower than a preset value; and
a start key for starting measurement of various characteristics of the optical fiber;
wherein when the start key is operated, the processing means detects the level of light received at the light-receiving means while the light source is not emitting light, and when the level of light received is equal to or higher than the preset value, the processing means determines that the optical fiber is serving as a communication line and inhibits the emission of the measuring light.

15. An optical time-domain reflectometer (OTDR) comprising:
a light-emitting element for emitting pulsating measuring light when driven;

branching means for applying the measuring light from the light-emitting element to an optical fiber to be measured, and for branching light supplied from the optical fiber;

light-receiving means for receiving the light branched out by the branching means and detecting a level of the light received; and processing means for detecting a level of the light supplied from the optical fiber after the OTDR is connected to the optical fiber, while not driving the light-emitting element, and for driving the light-emitting element only when the level of the is light received is equal to or lower than a preset value;

wherein when a power switch is turned on, the processing means detects the level of light received at the light-receiving means while the light source is not emitting light, and when the level of light received is equal to or higher than the preset value, the processing means determines that the optical fiber is serving as a communication line and inhibits the emission of the measuring light.

16. An optical time-domain reflectometer (OTDR) adapted to be provided at one end of an optical fiber laid in an optical communication line, and to apply measuring light to the optical fiber and measure various characteristics of the optical fiber based on light reflected from the optical fiber, said OTDR comprising:

a light source for emitting the measuring light to the optical fiber;

a light-receiving element for receiving the light reflected from the optical fiber and detecting a level of the light reflected;

processing means for inhibiting emission of the measuring light when the level of light detected by the light-receiving element before the measuring light is emitted from the light source is equal to or higher than a preset value; and a start key for starting measurement of various characteristics of the optical fiber;

wherein when the start key is operated, the processing means detects the level of light received at the light-receiving element while the light source is not emitting light, and when the level of light received is equal to or higher than the preset value, the processing means determines that the optical fiber is serving as a communication line and inhibits the emission of the measuring light.

17. An optical time-domain reflectometer (OTDR) adapted to be provided at one end of an optical fiber laid in an optical communication line, and to apply measuring light to the optical fiber and measure various characteristics of the optical fiber based on light reflected from the optical fiber, said OTDR comprising:

a light source for emitting the measuring light to the optical fiber;

a light-receiving element for receiving the light reflected from the optical fiber and detecting a level of the light reflected; and processing means for inhibiting emission of the measuring light when the level of light detected by the light-receiving element before the measuring light is emitted from the light source is equal to or higher than a preset value;

wherein when a power switch is turned on, the processing means detects the level of light received at the light-receiving element while the light source is not emitting light, and when the level of light received is equal to or higher than the preset value, the processing means determines that the optical fiber is serving as a communication line and inhibits the emission of the measuring light.

* * * * *